United States Patent [19]
Gonzalez

[11] 3,857,630
[45] Dec. 31, 1974

[54] MOBILE ANTI-GLARE SHIELD FOR VEHICLES

[76] Inventor: Cesar Poveda Gonzalez, 23, Rue Prince Moulay Abdallah, Casablanca, Morocco

[22] Filed: May 24, 1973

[21] Appl. No.: 363,339

[30] Foreign Application Priority Data
May 29, 1972  Spain .................................. 180914
Mar. 15, 1973  Spain .................................. 189742

[52] U.S. Cl. ............................ 350/276 R, 296/97 F
[51] Int. Cl. .............................................. B60j 3/02
[58] Field of Search ........... 350/276, 156; 296/97 F, 296/97 G, 97 J

[56] References Cited
UNITED STATES PATENTS

| | | | |
|---|---|---|---|
| 1,777,545 | 10/1930 | Bergman | 296/97 G X |
| 1,885,510 | 11/1932 | Chapman | 296/97 G |
| 2,493,192 | 1/1950 | Grey | 350/156 |
| 2,697,004 | 12/1954 | Hovis | 296/97 G |
| 2,932,539 | 4/1960 | Galbraith | 296/97 G |
| 3,029,103 | 4/1962 | Horrocks | 296/97 G |

*Primary Examiner*—John R. Corbin
*Attorney, Agent, or Firm*—Wenderoth, Lind & Ponack

[57] ABSTRACT

Self-moving anti-glare shield for vehicles which permits filtering and attenuating of solar, light, etc. radiations which might disturb the driver of a vehicle includes a transparent shield fastened to a shield holder tractioned by an endless wire the tautness of which is adjustable, which upon activating a polarity change-over control member receives movement from a motor and positions the shield at the precise desired point for filtering or attenuating the radiations.

2 Claims, 5 Drawing Figures

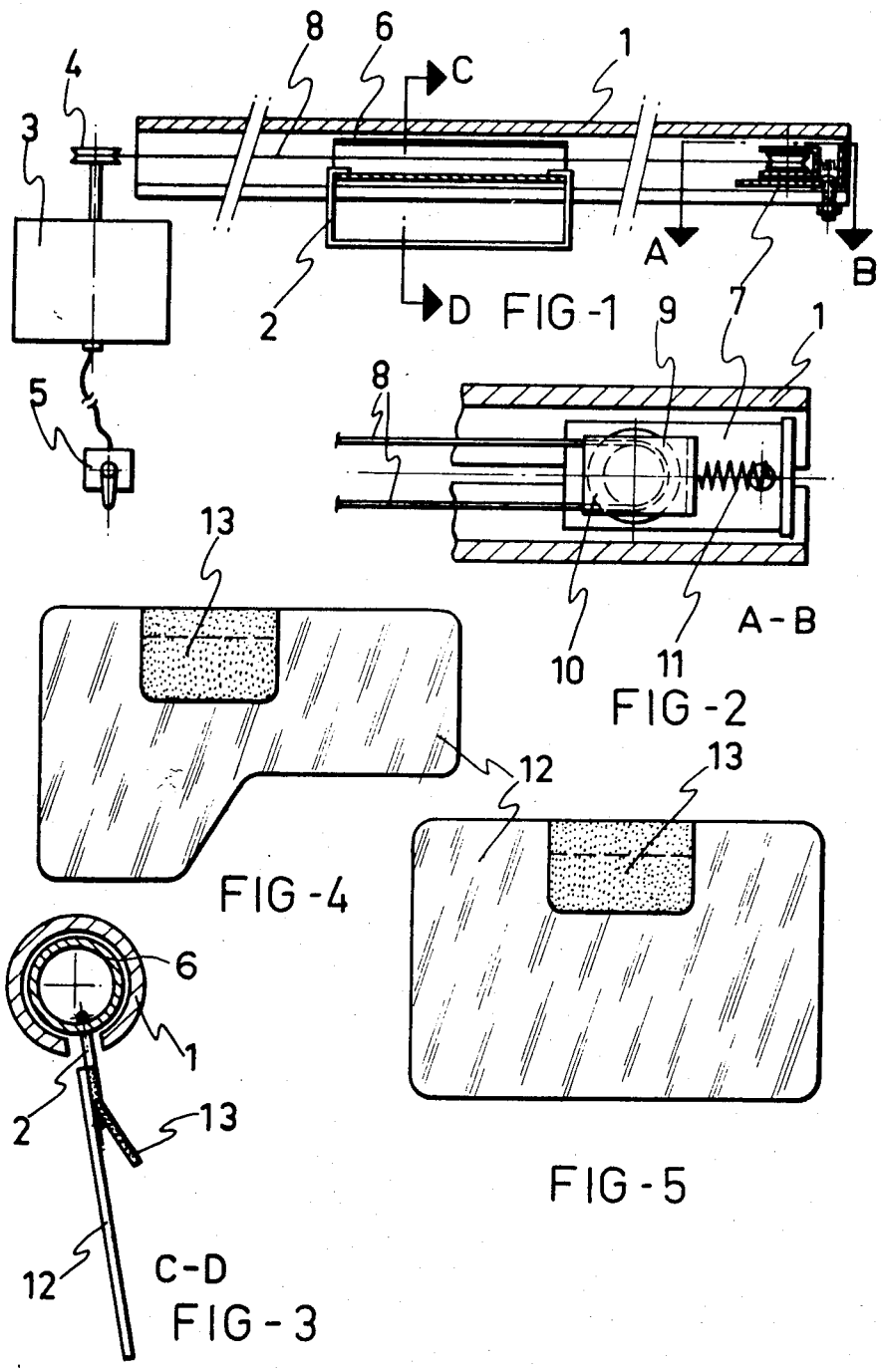

MOBILE ANTI-GLARE SHIELD FOR VEHICLES

BACKGROUND OF THE INVENTION

The object of this invention is to provide a device for protecting vehicle drivers against disturbing light radiations. The invention might be employed in all cases where an operator must be protected against light radiations which hinder his vision (for example, ultraviolet radiations, etc.). This application derives from or complements previous Utility Model No. 180,914.

Devices currently employed by the automobile industry to protect drivers against the sun are constituted by opaque rectangles (sun visors) situated in the upper part of the windshield, inside the vehicle. These can be tilted and thus offer effective protection if the sun is high in the sky. However, when it goes down, sun visor protection is totally ineffectual and solar rays dangerously hamper the driver of a vehicle going east in the morning or west in the afternoon. The driver has no alternative but to reduce his field of vision by squinting or driving with sharply reduced visibility which in both cases represents a serious threat to his safety and that of others.

On the other hand, and although the sun may be high in the horizon, light rays disturb the driver as they pass through the unprotected space between both visors. Due to frequent changes in the direction of a vehicle on a highway, the driver is suddenly and intermittently blinded, thus increasing the danger. To this is added reduced transparency of the windshield due to dust, insects, etc., which form a screen when the driver faces the sun. Finally, conventional sun visors are opaque and thus dangerously hamper the driver's visibility in the case of undulating roads.

This means of protection is not satisfactory except against the sun and then only in limited conditions, leaving the driver unprotected against other disturbing sources of light (headlights, etc.).

Other devices are known which tend to reduce these drawbacks; they are employed in different ways, which proves that the problem is substantial and has compelled the search for a solution. However, the multiplicity of prior attempts is implicit evidence that the problem is real and as yet unresolved.

In this sense there have been utilized:

Transparent or opaque strips of different colors glued to the upper part of the windshield. The meager protection is more or less that of the conventional sun visor insofar as area served, with the further drawback that during night hours some of the strips conceal city traffic lights located on high. This results in the risk of an accident.

Transparent or opaque sun visors located above the windshield on the exterior of the vehicle have the same drawbacks.

More or less transparent shields adhering to the windshield by means of vacuum cups offer partial protection.

Shields affixed by more or less ingenious means (utilizing the conventional sun visor as a base on which they are held by magnets) offer greatly reduced protection and on the other hand are susceptible of falling on the driver due to their weight and fastening means.

Opaque shields similar to the sun visor but which instead of tilting, unroll along the windshield. As in all the other means described, their installation requires that the driver leave the wheel to adjust them almost constantly (turns, upgrades, downgrades, etc.).

Additionally, since many of these means are opaque, reduced visibility, etc., are obvious.

On the other hand, all of these means are defective in that they do not offer sufficient protection against the sun. However, there are still other sources, at least as important, of light rays against which these means are totally ineffectual due to their conception and installation. Thus, when the vehicle travels during the night on a two-way road (as are most roads today and even on highways, when both counter stretches are side by side and have no anti-glare separation), a vehicle approaching from the opposite direction frequently blinds the driver (poor adjustment of one or both headlights, overloaded rear part of vehicle, delayed switching to dim lights, etc.).

On the other hand, this glare against which there are currently no means of effective protection, poses a triple threat, for not only is the driver blinded while the other vehicle faces him (and he therefore drives without visibility) but further, the drivers are almost blinded (maximum glare) as the vehicles pass each other, and finally the glare persists for a certain time afterwards (that time necessary for the retina to readjust; e.g., retinal rhodopsin) and therefore the driver proceeds without visibility.

To remedy these drawbacks to night driving, other specific means different from those employed for affording protection against the sun have been proposed. Thus, lamps have been designed to emit colored light which, aside from being cumbersome when the road is free of vehicles in the opposite direction (lighted interior, perception of different objects, shadows, decrease in concentration necessary during driving, etc.), unfortunately are of no great help against glare.

Special eyeglasses consisting of lenses of progressively darkening color have also been designed. Such glasses cannot be superimposed on glasses which a driver might already wear due to defective vision — and it is to be supposed that he wears them when driving at night — but, on the other hand, they force head movements which cause rapid fatigue.

In all of the cases described the results are the same: awkward driving due to lack of visibility and greater risk of accident because of nervous tension from driving in such unpleasant conditions.

SUMMARY OF THE INVENTION

The inconveniences and risks described (partial protection, difficult or impossible maneuvering at the moment most needed, fixed area of protection not adjusted to changing driving conditions, opacity which conceals the road, light signals, etc., or leads to error in this respect), find an ideal solution in the device which is the object of the invention. Indeed, not only is effective protection achieved against the sun during the day, but also against radiations (headlights, etc.) during the night, preventing glare in all instances.

Therefore, the present invention provides the only totally effective protection against the two different sources of light which are capable of causing hindrance.

This original protection system consists of a mobile shield which the driver can easily and rapidly interpose between his eyes and the troublesome source of light (sun, headlights, etc.) whenever the direction of such source of light (curves in the road, upgrades, downgrades, etc.) changes.

This shield offers the particularity that it can be removed at will by a simple movement when driving conditions make its use superfluous. It must be of a flexible material (cellulose acetate, or similar) and therefore its weight is insignificant so as to offer no danger in event of collision; further, it is unbreakable.

The shield must be transparent and can be of different colors. Those utilized during the day will be more or less dark, capable of filtering solar rays but always transparent so as not to reduce visibility. Shields such as the above or lighter in color can be used for the evening and they may even be polarized to increase their effectiveness. Visibility thus cannot be hampered at any time. The possibility of selecting "day" or "night" shields, and also a multiplicity of shapes and colors will enable their adjustment to the particular driving conditions and preferences of each driver.

The principal advantage of this new system which renders it convenient, practical and useful, lies in the fact that, without the driver having to lift his hands from the wheel or his eyes from the road, the shield moves quickly and easily along the windshield in such a way as to intercept almost instantaneously at any place, in any circumstance, light radiations which are disturbing and dangerous to the driver.

Its original conception thus renders effective protection whenever changes in the direction of the vehicle, road conditions and situation of the source of disturbing light occur.

The self-moving shield will constitute inestimable progress in the automobile industry and safety on the road, since it eliminates an as yet unresolved and serious inconvenience to driving, eliminating the effects of glare since its causes (sun, reverberation, ill-adjusted headlights, etc.) cannot be eliminated.

The system for protection against light radiations by means of a self-moving shield is composed of a "track" inside the vehicle at the upper part of the windshield, along the interior of which a "shield holder" slides, which, aided by a "traction wire" driven by an "electric motor" normally fed by the vehicle battery, can move in one direction or the other along the track when a "changeover switch" is activated to permit passage of current in opposite directions. A "tensioner" located at one of the track ends will be necessary in order to stretch the traction wire and permit proper performance. The shield holder will serve to support the "shield" which will thus be able to move along the windshield to intercept undesirable light radiations at a precise position.

The track is in the shape of a flexible material (plastic, or similar), and has an approximate diameter of for instance 10 mm. and a continuous lengthwise slot for instance 2 mm. wide. It will be placed above the windshield inside the vehicle and held to the chassis at least at its two ends. Its length may be adjusted to the width of each type of vehicle. The slot, through which part of the shield holder will emerge, will be oriented downwardly.

The shield holder, which must move inside the track, is a cylindrical or slightly elliptical component for instance 8 cm. long of any lightweight material, its diameter being sufficiently less than that of the track as to avoid friction which would hamper its movement. To this end it can in certain cases be equipped with a rolling system (wheels, for example). A frame of metal, plastic or any other material adequate for its purpose will be fixed at one end of the holder, describe a U, and be fixed to the other holder end. This frame, which will emerge through the slot in the track, supports the shield by means such as a flap attached thereto in such a way as to be conveyed from one end of the windshield to the other.

The traction wire must be fine and resistant. One of its ends will be directly joined (or by means of a small spring to act as a traction damper) to one of the ends of the shield holder tube from where the wire will extend toward the corresponding end of the track where the tensioner is located. The wire will pass around the tensioner, thus effecting a 360° turn, returning through the interior of the track to the other end thereof where, after passing around the driving pulley wheel, it will return through the interior of the track to the opposite end of the shield holder to which it will be attached.

The electric motor must be small and fed by continuous current. It may utilize power from the battery as its regular source. It may be situated at one of the ends of the track, or distant therefrom. By means of a pulley wheel (or any other appropriate mechanism) the motor traction wire to move in one direction or the other, depending on the direction of rotation of the motor, thus conveying the shield holder and shield to the desired position.

A changeover switch will enable changing as desired the direction of the current reaching the motor, wherefore it will instantaneously reverse the direction of rotation and consequently, the direction of movement of the shield holder, traction wire and shield. The changeover switch may be activated by hand or foot. In either case the switch must automatically return to neutral immediately after it is released, so that the motor ceases to function. Logically, the switch must be situated at a point accessible to the driver so that he may activate the same without removing his hands from the wheel or his eyes from the road.

The tensioner is a pulley wheel mounted by means of a spring on a support (flat and rectangular) inserted in the track, at one of the ends thereof to which it is fastened through the slot by means such as a screw and a nut. By loosening the nut the tensioner can be placed farther from or closer to the track end, and the traction wire is thus slackened or tightened. Once adjusted, the tensioner will be maintained in its new position by again tightening the nut.

The shield must be transparent, more or less rectangular in shape, very lightweight (cellulose acetate, or similar), unbreakable, and its tones and colors appropriate for the intended purpose. It must be easy to hang from the shield holder. Its width should be such that once placed over the shield holder its upper rim will coincide with the top of the windshield and its lower rim with the line of the horizon which the driver in driving position sees from his seat. Length may vary, although experience indicates a standard of approximately 20 cm. Corners should be rounded.

Each driver may have more than one shield, the dimensions, shapes, colors and tones of which may differ. In effect, shields to be utilized during the night are more useful if slightly wider (and then, situated over the shield holder, their lower rim drops somewhat lower than the horizon line) and if from the lower right part thereof (or left, if driving from the left) a strip has been cut in the shape of a rectangular trapezoid some 3 to 5 cm. high and about 8 to 10 cm. base. With such a type of shield the headlights of vehicles approaching from the opposite direction will never blind the driver, since their lighting intensity is attenuated by the part of the shield covering that side of the road, and visibility is maximum over that portion of the road behind the approaching vehicle since such portion is not covered by the shield.

The electric device can be replaced by any simple transmission system which is operated either by hand or foot.

BRIEF DESCRIPTION OF THE DRAWINGS

By way of illustration and to enable a clearer understanding of the invention, reference will be made to attached drawings wherein, FIG. 1 is a longitudinal section of the ensemble which can be coupled near the upper rim of the windshield of a vehicle to utilize the anti-glare shield proper.

FIG. 2 is an enlarged section taken along line A-B in FIG. 1.

FIG. 3 is a transversal section taken along line C-D in FIG. 1.

FIG. 4 is an elevation view of one of the anti-glare shield models which would be useful at night.

FIG. 5 is a view of an anti-glare shield which would be more useful during the day.

DETAILED DESCRIPTION OF THE INVENTION

With reference to the drawings, the system for protection against light radiation includes a track 1 positioned inside the vehicle at the upper part of the windshield. Along the interior of the track is slidably mounted a shield holder 6 which, aided by a traction wire 8 driven by an electric motor 3, normally fed by the vehicle battery, can move in one direction or the other within the track when a changeover switch 5 is activated to permit passage of current in opposite directions to the motor. A tensioner 7 located at one of the track ends will be necessary in order to stretch the traction wire and permit proper performance. The shield holder will serve to support a shield 12 which will thus be able to move along the windshield to intercept undesirable light radiations at a precise position.

The track is in the shape of a tube, preferably round, of flexible material (plastic, or similar), and has a suitable diameter, for instance 10 mm., and a continuous lengthwise slot of a suitable width, for instance 2 mm. The track will be placed above the windshield inside the vehicle and held to the chassis at least at its two ends. Its length may be adjustable to the width of each type of vehicle. The slot, through which part of the shield holder will emerge, will be oriented downwardly.

The shield holder 6, which must move inside the track 1, is a cylindrical or slightly elliptical component of a suitable length, for instance 8 cm., of any lightweight material, its diameter being sufficiently less than that of the track as to avoid friction which would hamper its movement. To this end shield holder 6 can in certain cases be equipped with a rolling system (wheels, for example). A frame 2 of metal rod, plastic or any other material adequate for its purpose will be fixed at one end of shield holder 6, be bent in a U, and fixed to the other end of the shield holder. Frame 2, which will emerge through the slot in the track, supports the shield 12 by means such as flap 13 extending over the central leg of the frame in such a way as to be conveyed from one end of the windshield to the other.

The traction wire 8 must be fine and resistant. One of its ends will be directly joined (or by means of a small spring to act as a traction damper) to one of the ends of shield holder 6 tube from where wire 8 will extend toward the end of the track 1 where the tensioner 7 is located. The wire passes around tensioner 7, thus effecting a 360° turn, and returns through the interior of track 1 to the other end thereof where, after passing around a driving pulley sheel 4, it will return through the interior of track 1 to the opposite extreme of shield holder 6 to which it is attached.

The electric motor 3 must be small and fed by continuous current. It may utilize power from the battery as its regular source. It may be situated at one of the extremes of track 1, or distant therefrom. By means of pulley wheel 4 (or any other appropriate mechanism) rotation of motor 3 will cause traction wire 8 to move in one direction or the other, depending on the direction of rotation of motor 3, thus conveying shield holder 6 and shield 12 to the desired position.

A changeover switch 5 will enable changing as desired the direction of the current reaching the motor, wherefore it will instantaneously reverse the direction of rotation and consequently, the direction of movement of shield holder 6, traction wire 8 and shield 12. Switch 5 may be activated by hand or foot. In either case switch 5 must automatically return to neutral immediately after it is released, so that the motor ceases to function. Preferably, switch 5 will be situated at a point accessible to the driver so that he may activate the same without removing his hands from the wheel or his eyes from the road.

The tensioner 7 includes a pulley wheel 9 mounted by means of a spring 11 on a support 10 (flat and rectangular) inserted in track 1 at one of the ends thereof to which it is fastened through the slot by means such as a screw and a nut. By loosening this nut the tensioner can be placed farther from or closer to the track end, and the traction wire 8 is thus slackened or tightened. Once adjusted, the tensioner will be maintained in its new position by again tightening the nut.

The shield 12 must be transparent, more or less rectangular in shape, very lightweight (cellulose acetate, or similar), unbreakable, and its tones and colors appropriate for the intended purpose. It must be easy to hang from shield holder 6. Its width should be such that once placed over the frame 2 of the shield holder its upper rim will coincide with the top of the windshield and its lower rim with the line of the horizon which the driver in driving position sees from his seat. Length may vary, although experience indicates a standard of approximately 20 cm. Corners should be rounded.

Each driver may have more than one shield, the dimensions, shapes, colors and tones of which may differ. In effect, shields to be utilized during the night are more useful if slightly wider (and then, situated over the shield holder, their lower rim drops somewhat lower than the horizon line), and if from the lower right part thereof (or left, if driving from the left) a strip has been cut in the shape of a rectangular trapezoid, for instance 3 to 5 cm. high and with approximately an 8 to 10 cm. base. With such a type of shield the headlights of vehicles approaching from the opposite direction will never blind the driver, since their lighting intensity is attenuated by the part of the shield covering that side of the road, and visibility is maximum over that portion of the road behind the approaching vehicle, since such portion is not covered by the shield.

The electric device can be replaced by any simple transmission system which is operated either by hand or foot.

I claim:

1. A mobile anti-glare shield device for a vehicle, said device comprising:

a longitudinal hollow track horizontally positionable above the windshield of a vehicle to extend completely across the width thereof, said track having a horizontal longitudinal slot extending throughout the length thereof, said slot extending downwardly;

first and second pulleys, one each mounted adjacent the opposite longitudinal ends of said track;

a motor mounted adjacent one end of said track and operatively connected to said first pulley to rotate the same;

tubular shaped shield holder means mounted to slide horizontally longitudinally within said track, the length of said shield holder means being substantially less than the length of said track;

a U-shaped frame attached to said shield holder means and extending downwardly therefrom through said slot in said track;

an anti-glare shield having a flap attached to an upper edge thereof, said shield being removably mounted on said frame by said flap being positioned over the central leg of said U-shaped frame, the length of said shield being substantially less than the length of said track;

a traction wire connected at the opposite ends thereof to the opposite longitudinal ends of said shield holder means, said traction wire extending longitudinally from said shield holder means ends and passing around said pulleys;

and reversable switch means connected to said motor for selectively causing said motor to rotate said first pulley in opposite directions, and for thus moving said traction wire, said shield holder means, said frame and said shield horizontally in opposite directions along said track.

2. A device as claimed in claim 1, further comprising a tensioning means operatively connected between said track and said second pulley for selectively tensioning said traction wire, said tensioning means comprising a support attached to said track and supporting said second pulley, and a spring means for urging said second pulley in a direction away from said first pulley.

* * * * *